United States Patent [19]

Katsuno et al.

[11] Patent Number: 5,577,314

[45] Date of Patent: Nov. 26, 1996

[54] METHOD OF FITTING A RUBBER-LIKE MOLDED PRODUCT TO A FITTED MEMBER

[75] Inventors: Nobuhiro Katsuno, Hachioji; Ikuzo Usami, Kanagawa-ken; Noriko Mizutani, Hachioji, all of Japan

[73] Assignee: Three Bond Co., Ltd., Tokyo, Japan

[21] Appl. No.: 424,937

[22] Filed: Apr. 19, 1995

Related U.S. Application Data

[62] Division of Ser. No. 155,310, Nov. 19, 1993.

[30] Foreign Application Priority Data

Feb. 23, 1993 [JP] Japan ................................ 5-57928
Apr. 21, 1993 [JP] Japan ................................ 5-117706

[51] Int. Cl.⁶ ........................................... B23P 11/02
[52] U.S. Cl. ........................... 29/451; 29/423; 29/235
[58] Field of Search ........................... 29/450, 451, 423, 29/235, 521; 277/9.5, 181, 186

[56] References Cited

U.S. PATENT DOCUMENTS

| | | |
|---|---|---|
| 3,694,894 | 10/1972 | Jehnek et al. ........................... 29/451 |
| 3,959,061 | 5/1976 | Renck et al. ........................... 29/235 X |
| 3,981,066 | 9/1976 | Calvert ................................... 29/235 X |
| 5,191,695 | 3/1993 | Parely et al. ........................... 29/451 |

FOREIGN PATENT DOCUMENTS

| | | |
|---|---|---|
| 61-124775 | 6/1986 | Japan . |
| 775930 | 4/1955 | United Kingdom ..................... 29/451 |

*Primary Examiner*—Peter Vo
*Assistant Examiner*—Khan V. Nguyen
*Attorney, Agent, or Firm*—Lowe, Price, LeBlanc & Becker

[57] ABSTRACT

A rubber-like molded product with a support frame includes a support frame having a predetermined shape; a connecting member constituted by a thin film or connecting ribs and engaged with the support frame separably therefrom; and a rubber-like molded product formed integrally in a region of the connecting member in such a manner as to be capable of being cut off from the connecting member. In this rubber-like molded product with a support frame, the support frame, the connecting member, and the rubber-like molded product are formed integrally by press molding or injection molding. In the assembly process, only the rubber-like molded product is cut off from the support frame and the connecting member of the integrated rubber-like molded product with a support frame by means of a pushing jig, and is fitted in a groove formed in a predetermined portion of a fitted member.

2 Claims, 8 Drawing Sheets

METHOD OF FITTING A RUBBER-LIKE MOLDED PRODUCT TO A FITTED MEMBER

This application is a division of application Ser. No. 08/155,310 filed Nov. 19, 1993, patent pending.

BACKGROUND OF THE INVENTION

1. Field of the Invention

The present invention relates to a rubber-like molded product with a support frame, a method of manufacturing the same, and a method of fitting a rubber-like molded product, and more particularly to a rubber-like molded product which can be used as a sealing material, a damping material, or the like for various mechanical components, a method of manufacturing the same, and a method of fitting the same.

2. Description of the Related Art

Conventionally, in order to provide a predetermined sealing effect, a damping effect or the like between component parts of various types of machines, a method is adopted in which a sealing material such as a gasket formed by, for instance, an annular rubber-like molded product is interposed between such component parts. As a method of fabricating an integrally formed product by fitting or bonding such a rubber-like molded product to a member to which the rubber-like molded product is fitted (herein and in the appended claims this member will be referred to as a fitted member), such as a coupling member constituting a split-type mechanical component, the following method is generally adopted. The rubber-like molded product is molded in advance by injection molding or press molding (compression molding), and, by means of handling equipment, this rubber-like molded product is press fitted into a groove or the like formed at a predetermined position of the fitted member or made integral therewith by using a predetermined adhesive agent.

In addition, under restricted conditions such as in a case where the shape of the rubber-like molded product is relatively simple, or in a case where the shapes of the rubber-like molded product and the fitted member conform to each other with a high degree of accuracy, the rubber-like molded product is, in some cases, fitted automatically to the fitted member by using an automated machine having an appropriate pushing jig or the like.

Furthermore, a method in which the integrally molded product is obtained by an insert molding method is also adopted in some other cases. This is a method in which the fitted member is placed in advance in a mold, and an injection material is injected into the mold in this state so as to obtain the integrally molded product. In addition, a method is also reported in which, by means of a double-injection molding method, after a plastic member is molded into a predetermined shape by primary molding, a secondary cavity is provided by replacing a part of the mold or by using a core back method, and the rubber-like molded product is formed by secondary molding, thereby manufacturing an integrally molded product.

It should be noted that when the rubber-like molded product is formed, it is unavoidable for a thin burr to be formed along a parting plane of the mold in the periphery of the rubber-like molded product, so that a deburring operation is required for the commercialization of the rubber-like molded product itself. Since the shape of the rubber-like molded product itself and the shape of the burr are irregular, it is difficult to automate this operation. Accordingly, the actual situation is such that the deburring operation is effected by handling equipment.

However, since the above-described method in which the rubber-like molded product is fitted to the fitted member by means of handling equipment is basically based on a manual operation, this method lacks in the efficiency in mass production, and results in higher cost. Also, variation in the quality of the product such as a fitting error is liable to occur, and expertise of the operator is required.

In addition the automatic fitting of a rubber-like molded product which is implemented in very restricted cases has had the drawback that it is restricted to cases where the shape of the rubber-like molded product is simple and the shapes of the rubber-like molded product and the fitted member conform to each other to fit in a simple manner. Further, under a condition where the site of fabrication of the rubber-like molded product and the site of fitting the rubber-like molded product to the fitted member differ, there arises the need to package the rubber-like molded product and transport it to the fitting site. In this case, however, deformation such as twisting is liable to occur due to vibrations or load applied to the rubber-like molded product, with the result that there has been a problem that the rubber-like molded product cannot be accurately placed on the automated machine for automatic fitting.

Furthermore, with the method of manufacturing an integrally molded product combining the rubber-like molded product and the fitted member by means of the insert molding method or the double-injection molding method, restrictions are imposed on the design of the fitted member to be inserted (the primary molded product in the double-injection molding method). Included among these restrictions are high accuracy in its shape for integration, the need to secure a large area for the arrangement of the rubber-like molded product, and the need to take into consideration the structure for integration. For this reason, if the shape of the product with the conventional rubber-like molded product fitted is adopted as it is, it is almost impossible to implement the above-described molding method. Hence, there has been a problem in that a special design is required in adopting the above-described molding method.

Figure 17:
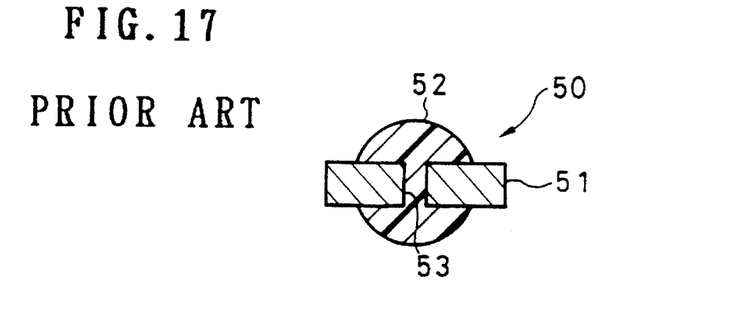
FIG. 17 is a cross-sectional view illustrating a conventional example.

To overcome the instability of the shape-retaining characteristic of the rubber-like molded product in a case where the rubber-like molded product is singly used, as shown in FIG. 17, a so-called carrier gasket 50, in which a shape supporting member 51 and a gasket 52, i.e., a rubber-like molded product, are formed integrally, has been put to commercial use. This carrier gasket 50 is molded such that the shape supporting member 51 is inserted in a mold, and the gasket 52 is formed by insert molding through a plurality of through holes 53 formed in the thicknesswise direction of the shape supporting member 51, i.e., vertically in the drawing.

In this case, however, it is essential to use the shape supporting member 51 as a part of the constituent elements of the product. Not only does this result in an increase in cost, but also it makes it difficult to adopt an O-ring structure and results in a decline in pressure resistance and the like. The fitted member to which this carrier gasket 50 is fitted must have a shape conforming thereto. Therefore, the restrictions imposed on the product design still remain.

Since the operation of deburring the rubber-like molded products results in increased cost due to a decline in mass-production efficiency, the mold is in some cases fabricated such that its parting line surface is finished to high accuracy so as to avoid a burr. However, there have been drawbacks in that the fabrication of such a mold requires a very high level of expertise, and that the mold thus fabricated lacks in versatility and leads to an even higher cost.

SUMMARY OF THE INVENTION

The present invention has been devised in view of the above-described drawbacks of the conventional art, and it is a first object of the present invention to provide a rubber-like molded product with a support frame in which the rubber-like molded product whose shape is unstable is supported by the support frame having a predetermined shape so as to constantly maintain the shape-retaining characteristic of tile rubber-like molded product in a stable manner.

A second object of the present invention is to provide a method of manufacturing a rubber-like molded product with a support frame in which the rubber-like molded product and the support frame which is used to ensure the aforementioned shape-retaining characteristic can be easily molded integrally.

A third object of the present invention is to provide a fitting method which makes it possible to fit only the rubber-like molded product to a fitted member simply and accurately in a state in which the aforementioned shape-retaining characteristic is maintained.

To attain the first object, the rubber-like molded product with a support frame in accordance with the present invention comprises: a support frame having a predetermined shape; a connecting member disposed in an inner region of the support frame and integrated with the support frame separably therefrom; and a rubber-like molded product molded integrally with the connecting member in such a manner as to be capable of being cut off from the connecting member with a predetermined pushing force.

To attain the second object, the method of manufacturing a rubber-like molded product with a support frame in accordance with the present invention comprises the steps of: forming the support frame in advance; and integrally molding the connecting member and the rubber-like molded product by a predetermined molding method, and, at the same time, allowing a portion of the connecting member to engage with the support frame so as to be integrated therewith.

To attain the third object, the method of fitting a rubber-like molded product in accordance with the present invention comprises the steps of: transporting the support frame by transporting means and positioning the support frame at a predetermined corresponding position of a fitted member to which the rubber-like molded product is fitted; fitting the rubber-like molded product into a predetermined portion of the Fitted member while cutting off the rubber-like molded product from the connecting member by means of a pushing jig disposed in face-to-face relation with the fitted member; and removing the connecting member and the support frame from the fitted member.

In accordance with the present invention, since the rubber-like molded product is integrated with the support frame by means of the connecting member, the shape which the rubber-bike molded product should essentially retain is maintained in a stable manner until the rubber-like molded product is fitted to the fitted member.

This rubber-like molded product with a support frame can be formed by a method in which after a step of forming the support frame first, the connecting member and the rubber-like molded product are molded by press molding (compression molding), injection molding or the like, and, at the same time, the connecting member is engaged with the support frame.

The fitting of the rubber-like molded product to the fitted member is realized by using a pushing force of a pushing jig in a state in which the support frame is disposed in position in face-to-face relation with the fitted member. Upon completion of this fitting, the support frame and the connecting member are removed away from the fitted member by means of the holding action of the transporting means and the sucking action of the pushing jig. The support frame and the connecting member thus removed are reutilized as the molding material of the support frame, the connecting member, or the rubber-like molded product.

The rubber-like molded products in accordance with the present invention are used, for instance, as members interposed between mechanical components of various types, such as gaskets and packing, or as electronic components, such as sheet-like contact rubber used in computers, cellular telephones or the like. In addition, as the method of molding the rubber-like molded product with a support frame, it is possible to use the press molding method and the injection molding method which are generally used extensively.

The press molding method is a method in which a vulcanizing agent and other additives are added to green rubber stock, and this material is kneaded by a kneader or two rolls, is gaged in conformity with the shape of the product, is placed in a mold, and is subjected to heating compression by a thermal press for several minutes at a temperature of 120° to 180° C. or thereabouts to allow the material to cure, thereby obtaining a molded product. At this juncture, a rubber-like molded product with a support frame can be fabricated if a support frame which is formed of a material capable of withstanding a temperature higher than the temperature of the thermal press is placed in advance in the mold.

As the material of the connecting member and the rubber-like molded product, any material can be generally used if it is used in press molding. In the embodiments, however, it is possible to use acrylate rubber, acrylonitrile-butadiene rubber (NBR), styrene-butadiene rubber (SBR) , natural rubber, urethane rubber, silicone rubber, fluoro rubber, and ethylene-propylene-diene-methylene rubber (EPDH). The material may be selected arbitrarily in accordance with its applications. As a method of curing these rubbers, a method based on sulfur vulcanization, a method based on peroxide vulcanization, or the like is used. In either method, a cross-linking reaction is caused to occur by heating, so as to effect curing. As for the connecting member, if an adhesive agent serving as a primer is applied in advance to the support frame, as required, it is possible to form a molded product in which the connecting member is integrated with the support frame by bonding.

In injection molding in the present invention, materials which may be used are broadly classified into thermoplastic elastomers and thermosetting elastomers. Molding methods which may be used are broadly classified into an insert molding method and a double-injection method. Here, as the thermoplastic elastomers, it is possible to use thermoplastics of vinyl chlorides, olefins, urethanes, polyesters, and fluorine. As their characteristics, it is possible to cite the fact that they can be molded at a very high speed in the same way as in the molding cycle of ordinary plastics, and that since the mold temperature is low, it is possible to use support frames made of materials whose heat-withstanding temperatures are low.

The thermosetting elastomers are classified into a millable type and a liquid type. In terms of its material, the millable type is basically the same as the materials used for the aforementioned press molding. In its molding, unvulcanized rubber kneaded and gaged in the form of tape is charged into an injection barrel, and is molded by injection molding. It is possible to use various materials at low cost in the same way as in press molding. On the other hand, in the liquid type, silicone resins and urethane resins can be generally used. Between these, the silicone resins have particularly short molding cycles, so that they have a large advantage in that the properties of their molded products are excellent.

The insert molding method in the injection molding method is a method in which, in the same way as press molding, the support frame is placed in advance in a mold, and the aforementioned material is injection-molded so as to fabricate an integrally molded product. The double-injection method which is alternatively used in the injection molding method is a method in which, after a plastic support frame is molded by primary molding, either a fixed mold half or a movable mold half is replaced by being slid or rotated, and a cavity for the connecting member and the rubber-like molded product, which are a secondary molded product, is provided so as to mold a rubber-like molded product with a support frame. At this juncture, as for the secondary cavity, it is possible to adopt a core back method in which a part inside the mold is moved. The absolute condition of the injection molding method is that the heat-withstanding temperature of the support frame, i.e., a primary molded product, is below the curing temperature of the connecting member and the rubber-like molded product, i.e., a secondary molded product, or the mold temperature. Therefore, there are cases where the combination of the primary molding material and the secondary molding material is limited. In this respect, if a thermoplastic elastomer is used as the secondary molding material, since the mold temperature during secondary molding is low, there is an advantage in that there is substantial versatility in tile selection of the material.

In the above-described molding methods, in the case of a liquid silicone rubber for injection molding, the connecting member and the rubber-like molded product are preferably molded with a molding cycle of not more than 60 sec. and under an injection pressure of not more than 150 kgf/cm$^2$. In the case of a liquid urethane rubber for injection molding, the connecting member and the rubber-like molded product are preferably molded with a molding cycle of not more than 300 sec. and under an injection pressure of 70 kgf/cm$^2$.

It should be noted that, as the material for forming the support frame in the present invention, a material which has appropriate rigidity and capable of imparting a shape-retaining function is used. Specifically, the support frame can be formed by using a metal material such as iron, aluminum, stainless, and a magnesium alloy, wood, or various synthetic resin materials of thermoplastic or thermosetting types.

The above and other objects, features and advantages of the present invention will become more apparent from the following detailed description of the invention when read in conjunction with the accompanying drawings.

DETAILED DESCRIPTION OF THE PREFERRED EMBODIMENTS

Referring now to the accompanying drawings, a description will be given of the preferred embodiments of the present invention.

Figure 1:
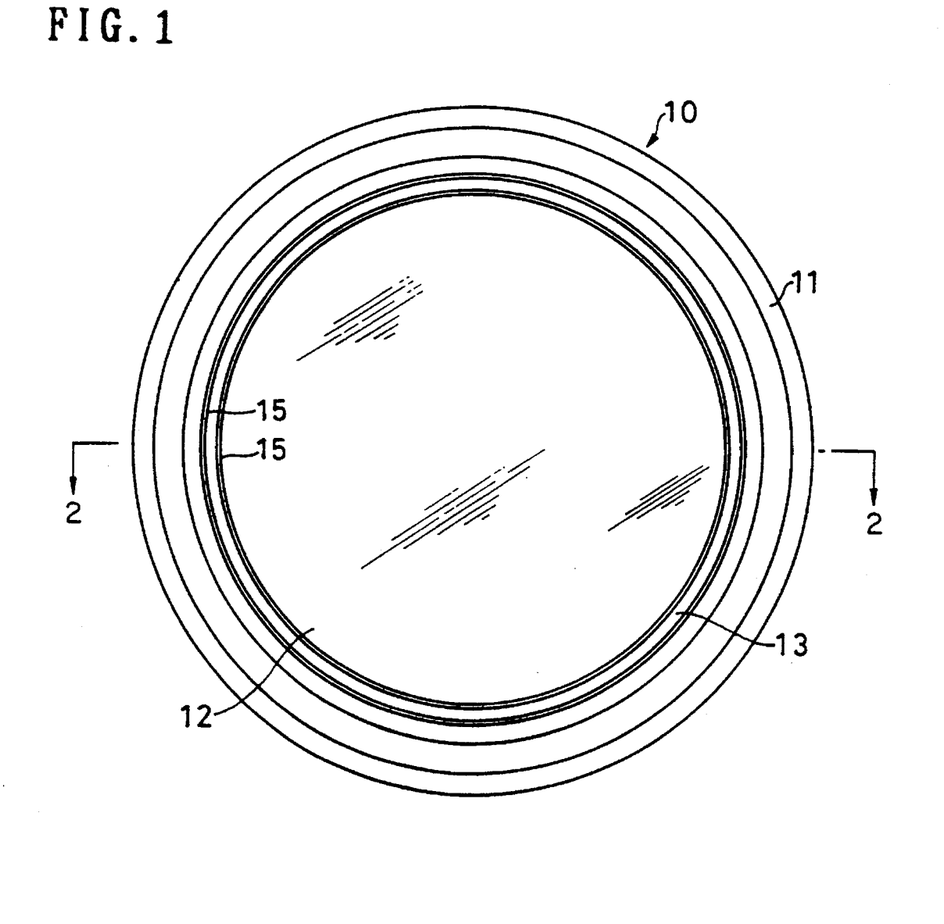
FIG. 1 is a plan view illustrating a first embodiment of a rubber-like molded product with a support frame in accordance with the present invention.
Figure 2:
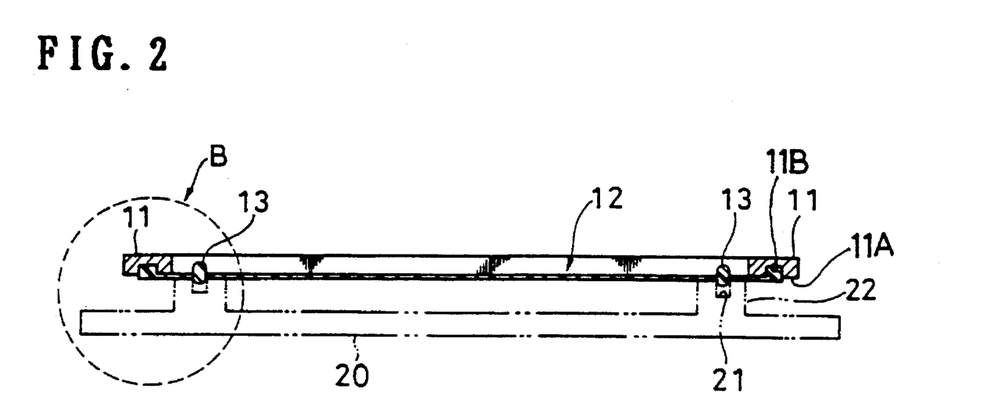
FIG. 2 is a cross-sectional view taken in the direction of the arrows along line 2—2 of FIG. 1.
Figure 3:
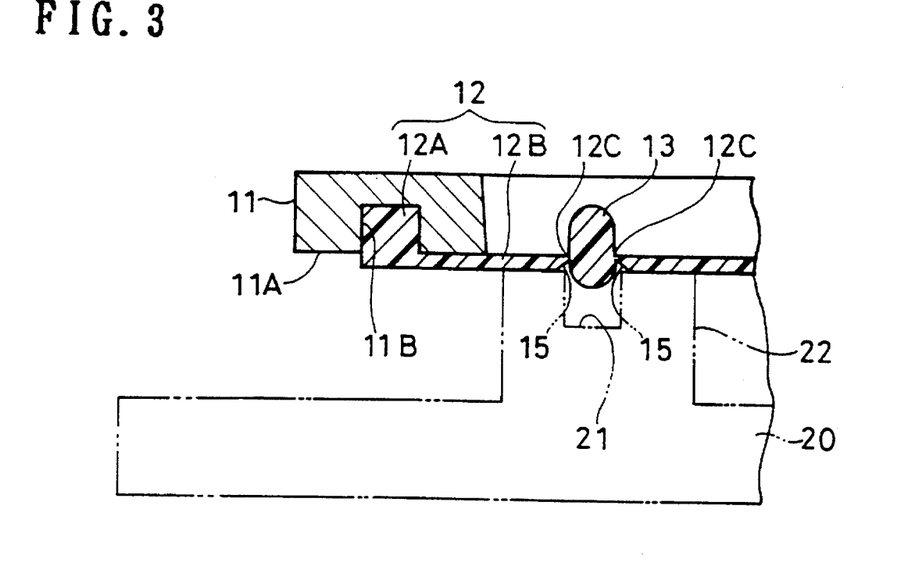
FIG. 3 is an enlarged cross-sectional view of portion B of FIG. 2.

In FIGS. 1 to 3 which illustrate a first embodiment, a rubber-like molded product with a support frame, generally designated at 10, is formed with a substantially disk-like shape as a whole. This rubber-like molded product with a support frame 10 is comprised of a support frame 11 having a substantially annular shape, a thin film 12 serving as a connecting member formed in an inner region of this support frame 11, and an annular rubber-like molded product 13 located concentrically with the support frame 11 in the region where the thin film 12 is formed.

The support frame 11 is formed by using aluminum as a forming material in this embodiment. This support frame 11 is used to temporarily maintain the shape of the rubber-like molded product 13 in cooperation with the thin film 12, and is ultimately separated from the rubber-like molded product 13 and is reutilized. As shown in FIGS. 2 and 3, this support frame 11 is arranged as follows: A groove structure portion 11B extending in the form of a slit is formed over an entire circumferential area of one surface 11A of the support frame 11, and an outer peripheral portion 12A, i.e., a portion of the thin film 12, is separably engaged in the groove structure portion 11B, and makes it possible to support the rubber-like molded product 13 as a unit.

The thin film 12 is formed of the same material as that of the rubber-like molded product 13, and is comprised of the outer peripheral portion 12A and a thin-film portion 12B which is provided in such a manner as to be pulled toward the inner side of this outer peripheral portion 12A. In this embodiment, this thin-film portion 12B is formed with a thickness of 0.5 to 2 mm. This thin film 12 is not used ultimately as in the case of the support frame 11, and after the rubber-like molded product 13 is cut off, the thin film 12 is utilized again as a molding material in the case of a thermoplastic resin.

The rubber-like molded product 13 is a gasket or a damping component interposed between mating members as in the case of a coupling member, and is used for obtaining a predetermined sealing effect, a damping effect or the like. This rubber-like molded product 13 is formed integrally with the thin film 12 in such a manner as to be capable of being cut off from the thin film 12. The cross-sectional configuration of the rubber-like molded product 13 is provided in an elliptical shape in which it is slightly elongated in a direction perpendicular to the planar direction of the thin film 12. However, this configuration is changeable, as required, and is not an essential element of the present invention. In this rubber-like molded product 13, a wedge-shaped notched groove 15 is formed at a connecting portion between the rubber-like molded product 13 and the thin film 12, as shown in enlarged form in FIG. 3. The rubber-like molded product 13 and the thin film 12 are connected to each other via a very thin connecting film portion 12C provided on each side of the rubber-like molded product 13, whereby the rubber-like molded product 13 is easily cut off from the thin film 12 with a predetermined pressing force and is accommodated in a groove 21 formed at an end face of a flange 22 of a fitted member 20 constituting a coupling member or the like. At this juncture, each connecting film portion 12C may be provided with thinner, indented portions in the form of perforations, thereby facilitating the cutting off. It should be noted that the connecting film portion 12C is preferably provided with a thickness of 0.05 to 0.4 mm.

Next, a description will be given of a molding method in accordance with this embodiment.

Figure 4:
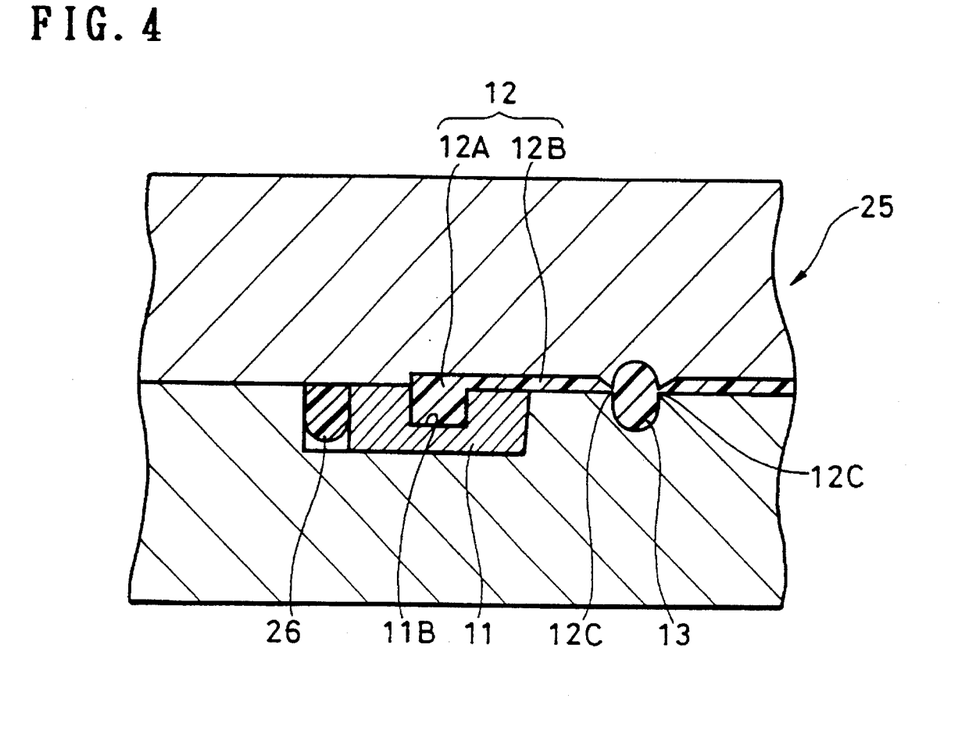
FIG. 4 is a cross-sectional view of an essential portion of the interior of a mold for explaining a method of manufacturing a rubber-like molded product with a support frame in accordance with the embodiment.
Figure 5:
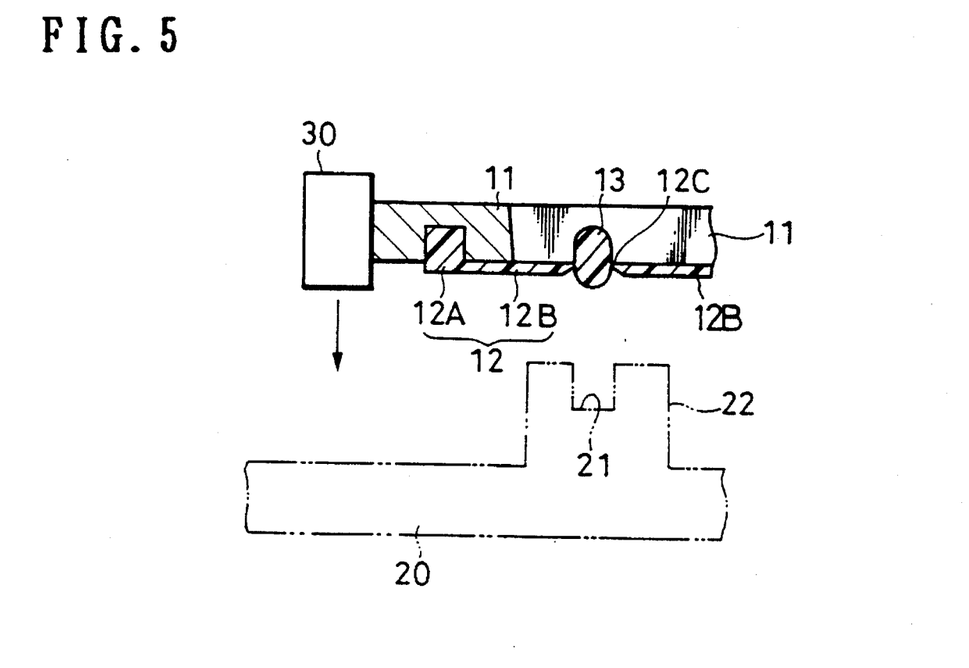
FIG. 5 is an explanatory diagram illustrating an initial step in an embodiment of a method of fitting a rubber-like molded product in accordance with the present invention

In this embodiment, as shown in FIG. 4, after the support frame 11 made of aluminum is inserted into a press mold 25, press molding is effected by a usual method, thereby forming the rubber-like molded product with a support frame 10. As the molding conditions in this case, an acrylate rubber of a sulfur vulcanization type was used for the thin film 12 and the rubber-like molded product 13, vulcanization was effected under the curing conditions of a mold temperature of 170° C. and a curing time of 5 minutes, and press pressure was set to 50 tons.

When press molding is effected in accordance with this embodiment, the injected material protrudes around the support frame 11, and a burr 26 is generally formed, as shown in FIG. 4. However, since this burr 26 is present via an extremely thin burr portion of 20 μm or less, after the molded assembly is removed from the mold 25, the burr 26 can be removed simply by being pulled off. Since the position of the burr 26 is fixed, the automation of the deburring operation itself can be realized without any problem.

As another molding method in accordance with this embodiment, an insert injection method using a liquid silicone rubber was also adopted, in which case molding was effected at a mold temperature of 150° C. by setting the curing time to 1 minute. In this molding as well, in a case where the formation of a burr on the outer side of the support frame 11 becomes a problem, if a projection having a height of 0.2 mm or thereabouts is provided in advance on the aforementioned surface 11A of the support frame 11 around the groove structure portion 11B formed in the support frame 11, and if this projection is crushed when the mold 25 is closed to eliminate a clearance at the parting surface, then the formation of the burr can be avoided satisfactorily.

Referring now to FIGS. 5 to 9, a detailed description will be given of a method of fitting the rubber-like molded product 13 in accordance with this embodiment.

in an initial step, the rubber-like molded product with a support frame 10 is transported to a predetermined position on the fitted member 20 fixed in position while the overall rubber-like molded product with a support frame 10 is being held by a transporting means 30 such as a robot arm. At this time, the relative positions of the rubber-like molded product with a support frame 10 and the fitted member 20 are set such that the transporting means 30 is lowered at a position where the center of the rubber-like molded product 13 and the center of the groove 21 extending in the circumferential direction and formed in the fitted member 20 are aligned with each other, and the driving of the transporting means 30 is stopped at a predetermined position where the thin-film portion 12B abuts against the end face of the flange 22 of the fitted member 20 (see FIG. 5).

Figure 6:
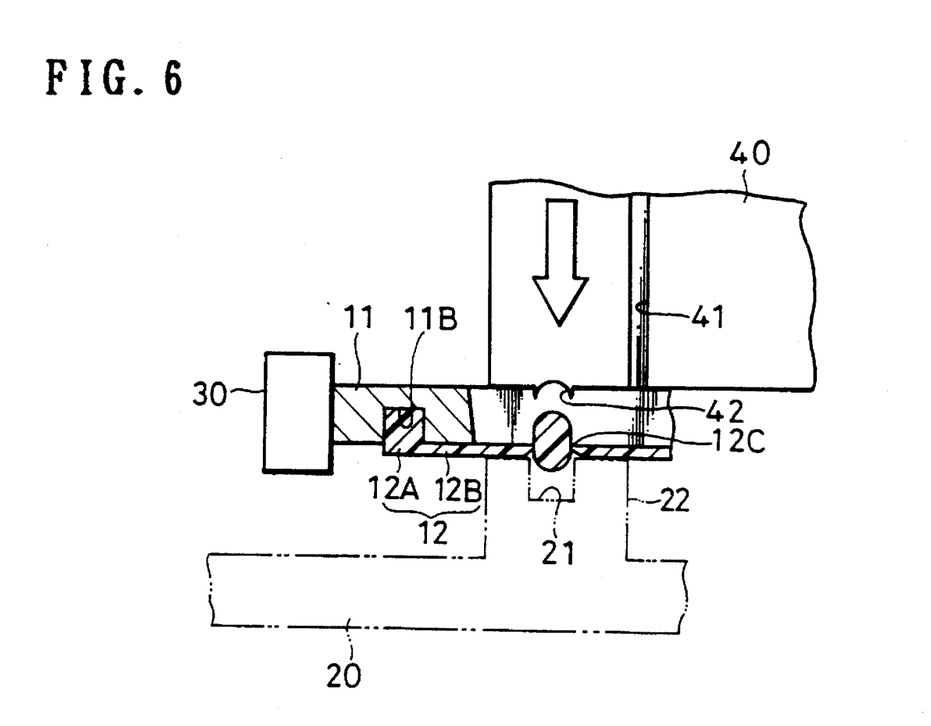
FIG. 6 is an explanatory diagram illustrating an intermediate step of the fitting method.

When the rubber-like molded product 13 thus reaches the predetermined position, a pushing jig 40 disposed above the fitted member 20 starts to be lowered toward the fitted member 20, as shown in FIG. 6. When the pushing jig 40 is further lowered to impart a pushing force to the rubber-like molded product 13, the rubber-like molded product is cut off from the connecting film portions 12C by cutting blades 42 formed on the pushing jig 40, and is pressure-fitted into the corresponding groove 21 (see FIG. 7).

Figure 7:
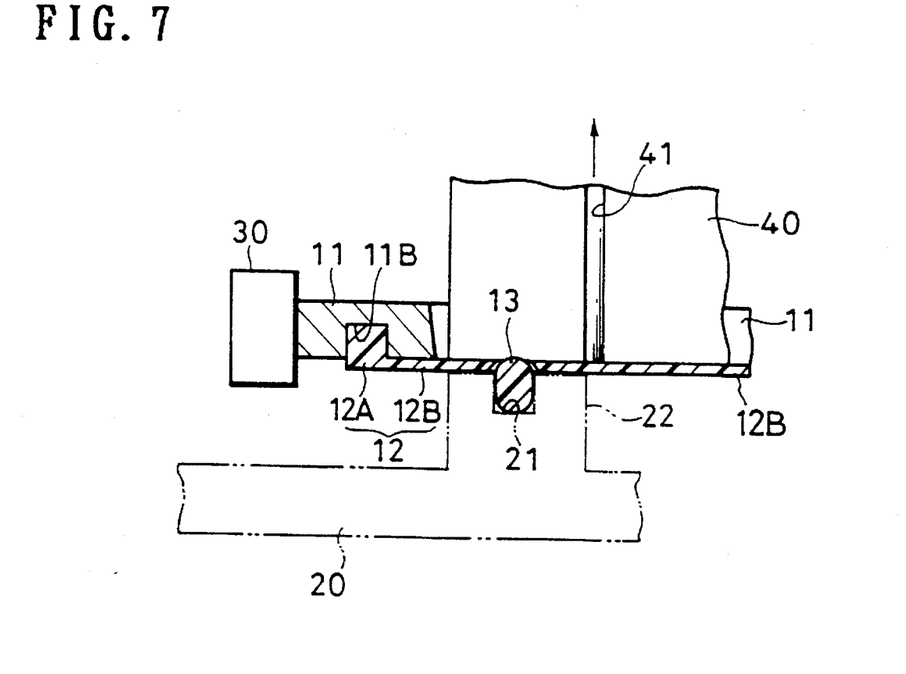
FIG. 7 is an explanatory diagram illustrating a state in which a pushing Jig used in the fitting method has pushed the rubber-like molded product into a groove formed in a fitted member.
Figure 8:
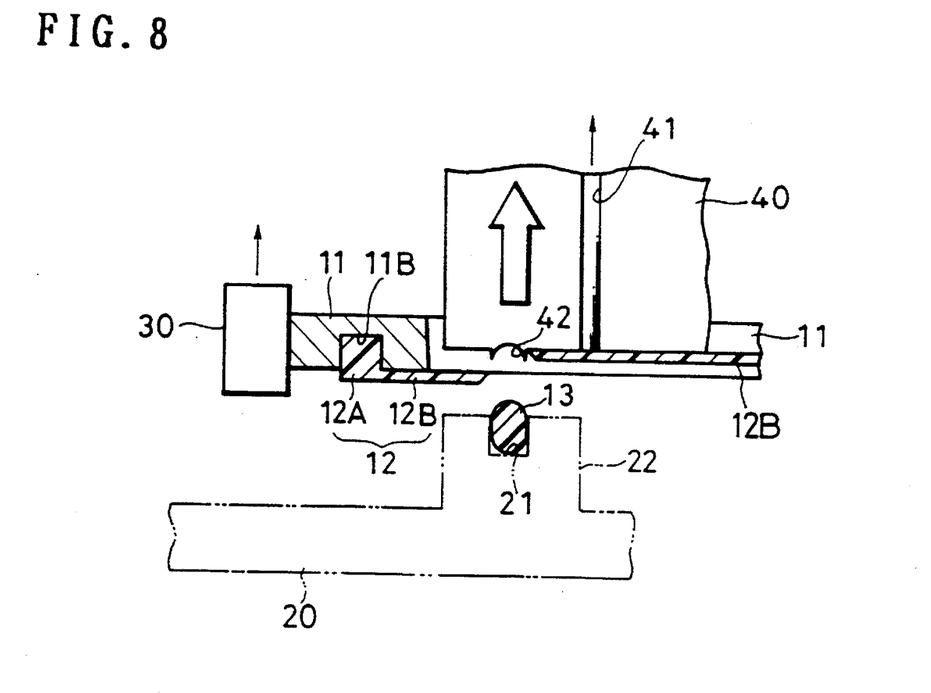
FIG. 8 is an explanatory diagram illustrating a final step of the fitting method.
Figure 9:
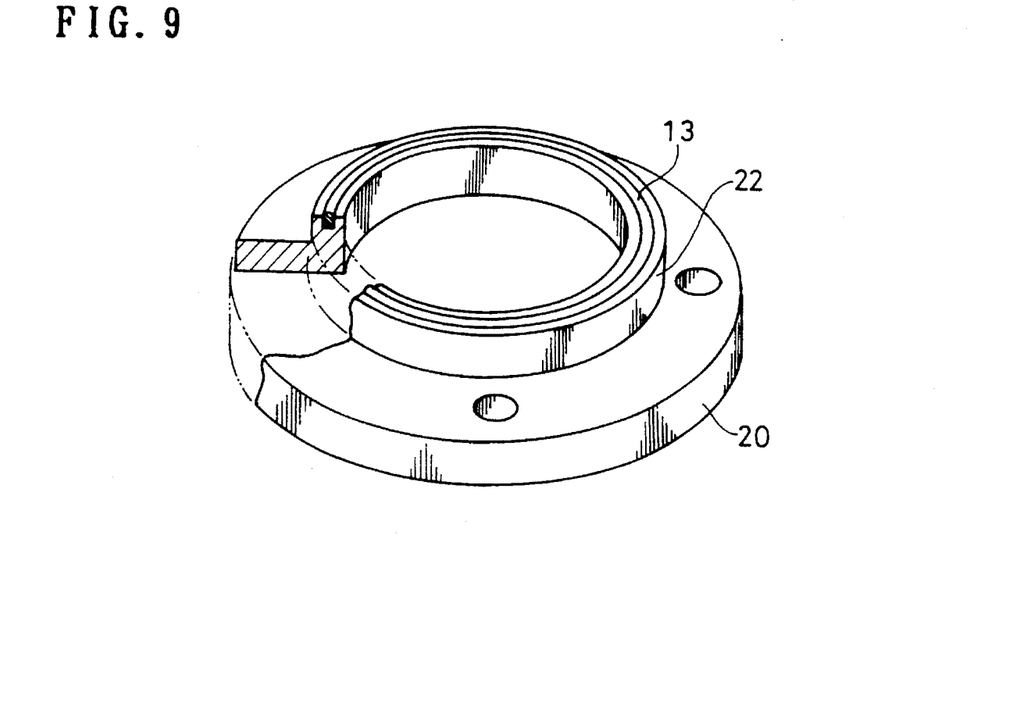
FIG. 9 is a perspective view, partly in section, of a state in which the rubber-like molded product is fitted in the fitted member in accordance with the fitting method.

At this time, as shown in FIGS. 7 and 8, a vacuum hole 41 constituting a suction mechanism formed in the pushing jig 40 sucks the thin-film portion 12B present in the inner region of the rubber-like molded product 13 by means of an unillustrated pressure-reducing pump. The pushing jig 40 is raised while maintaining this state, and the transporting means 30 is also raised by following the pushing jig 40. As a result, as shown in FIG. 9, only the rubber-like molded product 13 can be accommodated and held in the groove 21 formed in the end face of the flange 22 of the fitted member 20.

The support frame 11 held by the transporting means 30, a portion of the thin film 12 made integral therewith, and the thin-film portion 12B sucked by the pushing jig 40 are subsequently removed. The support frame 11 is reutilized as a component for molding an ensuing rubber-like molded product with a support frame, while the thin film 12 is also reutilized as the molding material.

Accordingly, although in the conventional example in which only tile rubber-like molded product is formed as a single unit, since the shape of the rubber-like molded product is unstable, there has been a drawback that the automation of the molding operation is difficult due to the difficulty in the automatic ejection of the rubber-like molded product by an eject pin at the time of removal from the mold, in accordance with this embodiment, the rubber-like molded product 13 is formed integrally with the support frame 11 via the thin film 12. Since this support frame 11 is relatively rigid in terms of its shape, automatic ejection becomes possible, so that there is an advantage in automating the overall molding process.

In addition, since the rubber-like molded product with a support frame 10 in accordance with this embodiment can be automatically fitted to the fitted member 20 by means of the transporting means 30 and the pushing jig 40, it is possible to better suppress the variation of the quality such as fitting error by eliminating the manual operation. At the same time, mass-production efficiency can be improved, making it possible to realize a substantial reduction in the manufacturing cost. Moreover, even in a case where the site of fabrication of the rubber-like molded product with a support frame 10 is remote from the site of fitting the same to the fitted member, the shape-retaining characteristic of the rubber-like molded product 13 itself is ensured reliably by the support frame 11 and the thin film 12, and it is expected that deformation due to transport can be positively avoided.

Furthermore, in this embodiment, the arrangement provided is such that the support frame 11 and the thin film 12 are removed at the time of fitting the rubber-like molded product 13, and they are made recoverable. Accordingly, the support frame 11 as it is can be reutilized as a support frame for an ensuing molded product, and the thin film 12 can also be reutilized by being melted again. From a broad point of view, it is possible to make effective contributions to a substantial reduction in the manufacturing cost. Moreover, since a shape-supporting member 51 shown in FIG. 17 as a conventional example is not used at all in this arrangement, the O-ring structure can be easily adopted. Therefore, the rubber-like molded product 13 with a support frame has the effect of effectively exhibiting a desired water-proofing characteristic or the like, and makes it possible to alleviate restrictions in the design of the fitted member 20.

With respect to the problem of a burr which can be formed during actual molding, if a projection is provided around the groove structure portion lib formed on the support frame 11, as described above, the clearance at the parting surface can be eliminated by crushing this projection when the mold is closed. Hence, there is an advantage in that the formation of the burr can be avoided effectively.

Since the pushing jig 40 has the cutting blades 45 formed thereon. The rubber-like molded product 13 can be cut off from the thin film 12 without damaging or deforming the cross-sectional configuration of the rubber-like molded product 13. As a result, it is possible to ensure the desired waterproofing effect, damping effect, and the like.

It should be noted that the rubber-like molded product with a support frame 10 in accordance with the present invention is not limited to the foregoing embodiment in which a single rubber-like molded product 13 is provided with respect to a single support frame 11. For example, it is possible to adopt a modification such as the one shown in FIG. 10.

Figure 10:
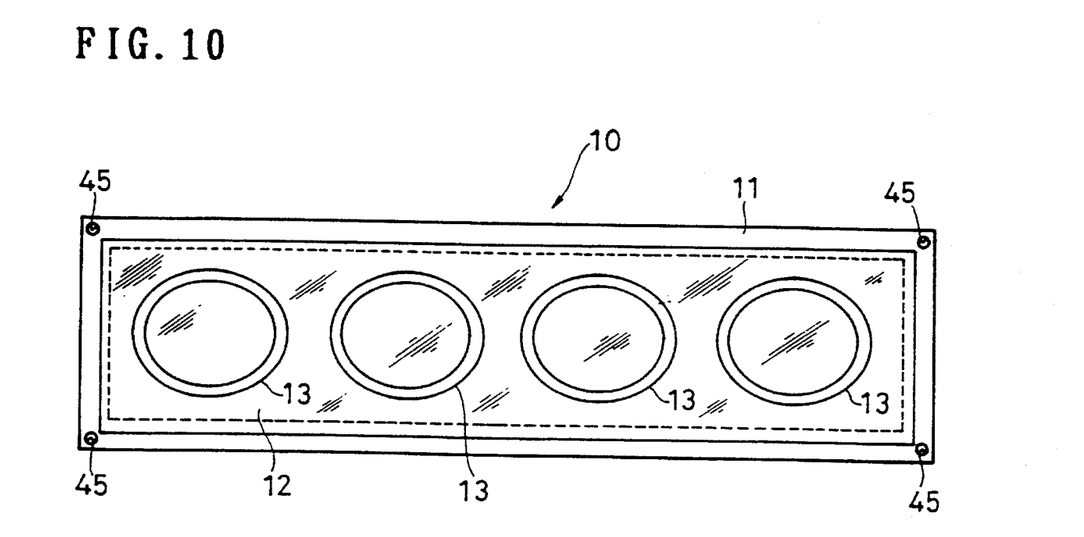
FIG. 10 is a front elevational view illustrating a modification of the rubber-like molded product with a support frame.

Specifically, this modification is an example in which the rubber-like molded product 13 is used as a gasket which is fitted to a mounting surface of an engine mount of an intake manifold of an automobile. Here, a plurality of rubber-like molded products 13 constituting gaskets are formed at equal intervals in an area of the thin film 12 within an inner region of the single support frame 11. At the same time, holes 45 constituting a positioning means are formed at the four corners of the support frame 11. These holes 45 are engageable with the unillustrated fitted member. The rubber-like molded products 13 are set in predetermined fitting positions in a state of this engagement. At this juncture, projections may be provided instead of the holes 45. In this case, a similar effect can be obtained if holes which can engage with the projections are formed in the corresponding fitted member 20 or the mold 25. A fitting method in this embodiment can also be effected in a procedure similar to that for the above-described embodiment.

Accordingly, in accordance with such a modification, the fitting of four gaskets in a four-cylinder engine can be effected by a single pushing operation, so that there is an additional advantage in that such a fitting operation can be performed simply and speedily. Furthermore, since the positioning holes 45 are provided, it goes without saying that the positions of the rubber-like molded products 13 can be determined accurately. Additionally, in a case where the support frame 11 is placed in the mold and insert molding is effected, if appropriate projections corresponding to these holes 45 are formed inside the mold, the holes 45 can be used as guides for placement in the mold.

The groove structure portion 11B of the support frame 11 in the present invention need not be provided in the entire circumferential area of the support frame 11. In other words, appropriate recesses may be provided in the support frame 11 at predetermined intervals so that an outer peripheral portion of the thin film 12 is partially engaged in these recesses so as to be integrally formed.

Figure 11:
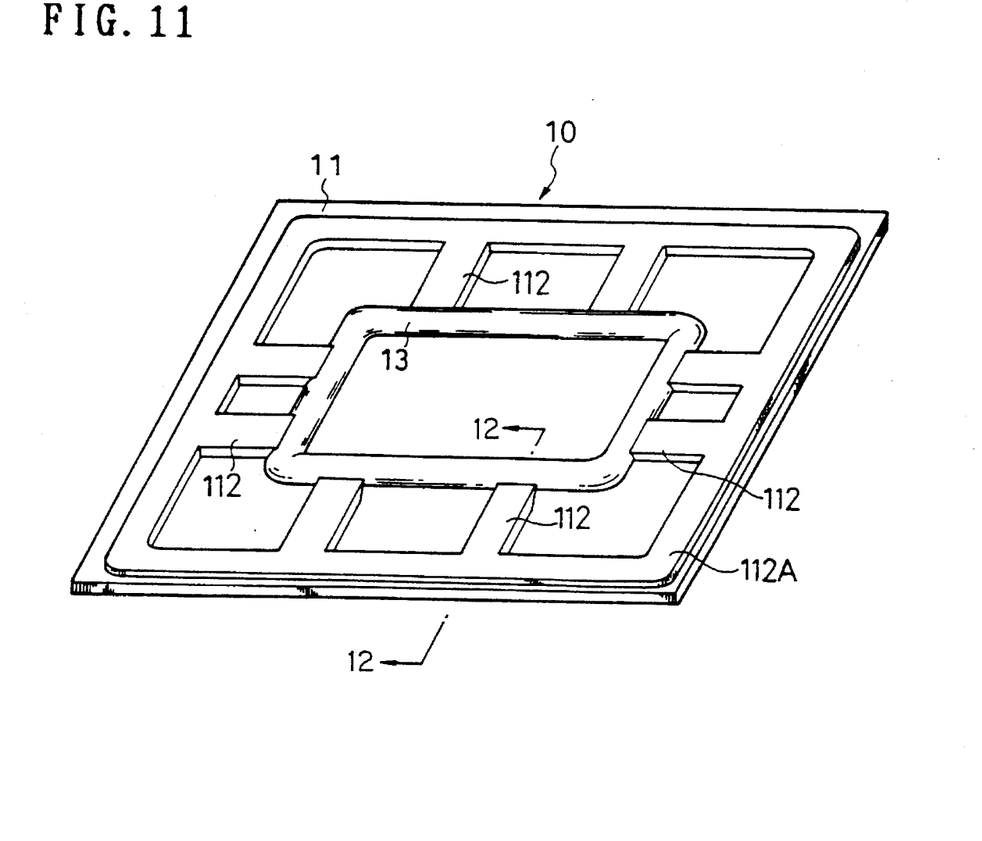
FIG. 11 is a perspective view of a rubber-like molded product with a support frame in accordance with a second embodiment.
Figure 12:
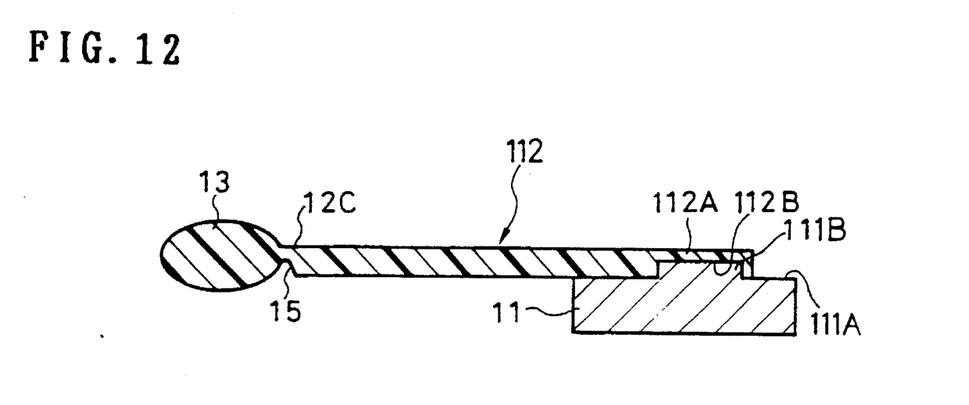
FIG. 12 is a cross-sectional view taken in the direction of the arrows along line 12—12 of FIG. 11.
Figure 13:
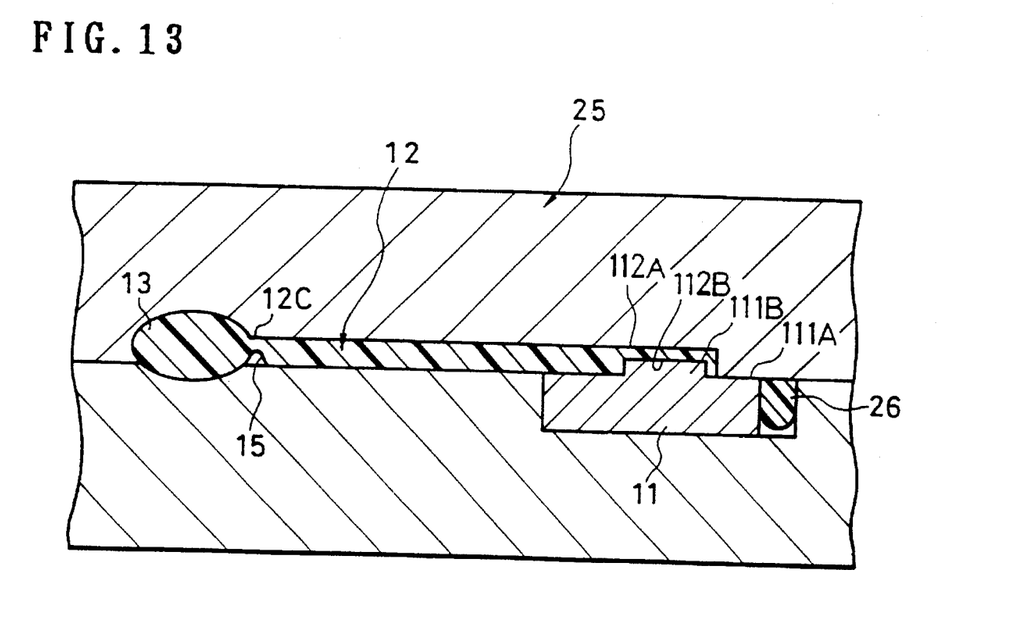
FIG. 13 is a cross-sectional view of an essential portion of the interior of a mold for explaining a method of manufacturing a rubber-like molded product with a support frame in accordance with the second embodiment.

Referring now to FIGS. 11 to 13, a description will be described of a second embodiment of the rubber-like molded product with a support frame in accordance with the present invention. In the description that follows, constituent portions which are identical or equivalent to those of the first embodiment will be denoted by the same reference numerals, as necessary, and description thereof will be omitted or simplified.

As shown in FIG. 11, the rubber-like molded product with a support frame 10 in accordance with the second embodiment is comprised of the support frame 11 having the shape of an open rectangle, the rubber-like molded product 13 disposed within the inner region of this support frame 11, and connecting ribs 112 disposed between the support frame 11 and the rubber-like molded product 13 and serving as connecting members for interconnecting the support frame 11 and the rubber-like molded product 13 to integrate them.

As shown in FIG. 12, the support frame 11 has an engaging structure portion 111B formed protrudingly on one surface 111A thereof, i.e., on the upper surface in the drawing, over the entire peripheral region of the support frame 11.

The plurality of connecting ribs 112 are formed of the same material as that of the rubber-like molded product 13, and are respectively formed in the shape of a belt or a plate in this embodiment. The connecting ribs 112 have a connecting frame 112A for interconnecting outer ends thereof. A recess 112B which can be engaged with the engaging structure portion 111B of the support frame 11 is formed in this connecting frame 112A, while an inward end of each connecting rib 112 is connected to the rubber-like molded product 13. These connecting ribs 112 are formed with a thickness of 0.5 to 2 mm in this embodiment.

In the rubber-like molded product 13, the wedge-shaped notched groove 15 is formed at the connecting portion between the rubber-like molded product 13 and the connecting rib 112, as shown in FIG. 12. The rubber-like molded product 13 and the connecting ribs 12 are connected to each other via very thin connecting film portions 12C, whereby the rubber-like molded product 13 can be easily cut off from the connecting ribs 112 with a predetermined pressing force and is accommodated in an appropriate groove of an unillustrated fitted member constituting a coupling member or the like. At this juncture, each connecting film portion 12C may also be provided with thinner, indented portions in the form of perforations in the second embodiment as in the first embodiment, so as to facilitate the cutting off. It should be noted that the connecting film portion 12C is preferably provided with a thickness of 0.05 to 0.4 mm.

Next, when the rubber-like molded product with a support frame in accordance with the second embodiment is molded, as shown in FIG. 13, the support frame 11 made of aluminum is inserted into the press mold 25, and the same press molding method and the insert injection method used in the first embodiment can be used. Also, the same molding conditions, such as the mold temperature, and the same material are used.

The rubber-like molded product with a support frame 10 formed as described above is attached to an attaching surface of the fitted member by using the above-described fitting method.

In accordance with the second embodiment as well, it is possible to obtain advantages similar to those in the foregoing embodiment. Additionally, it is possible to obtain an advantage in that an amount of the molding material of tile connecting ribs 112, which constitute the connecting members, can be reduced.

Figure 14:
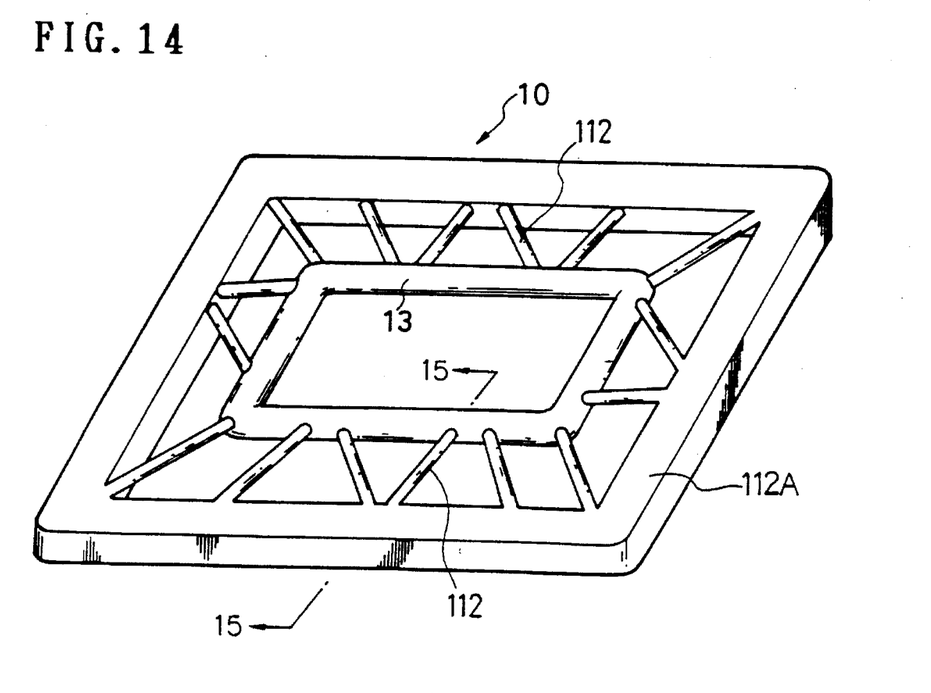
FIG. 14 is a perspective view of a rubber-like molded product with a support frame in accordance with a third embodiment.
Figure 15:
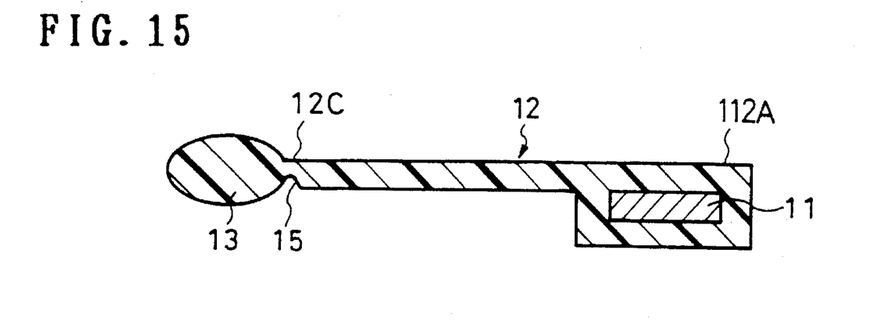
FIG. 15 is a perspective view taken in the direction of the arrows along line 15—15 of FIG. 14.

Referring now to FIGS. 14 and 15, a description will be given of a third embodiment of the present invention.

The third embodiment shown in FIGS. 14 and 15 are characterized in that the connecting ribs 112 are respectively formed in the shape of a rod, and the entire peripheral surface of the support frame 11 for supporting the connecting ribs 112 and, hence, the rubber-like molded product 13 is surrounded by the connecting frame 112A which is provided in such a manner as to interconnect the outer ends of the connecting ribs 112, as shown in FIG. 15. The other arrangements are substantially similar to those of the second embodiment.

In accordance with this third embodiment as well, it is possible to obtain advantages similar to those of the second embodiment. Additionally, it is possible to obtain another advantage in that the areas of connection to the rubber-like molded product 13 can be reduced further, so that when the rubber-like molded product 13 is fitted, the rubber-like molded product 13 can be cut off with a smaller pushing force.

Furthermore, since the arrangement adopted is such that the entire periphery of the support frame 11 is surrounded by the connecting frame 112A, even if an external force is applied to the molded assembly, it is possible to positively avoid the risk of the connecting ribs 112 and the rubber-like molded product 13 from being separated from the support frame 11. After the rubber-like molded product 13 is fitted to the fitted member, if an outer peripheral region of the support frame 11 is provided with an appropriate cut by means of a cutter knife or the like, the connecting ribs 112 and the support frame 11 can be separated easily.

Figure 16:
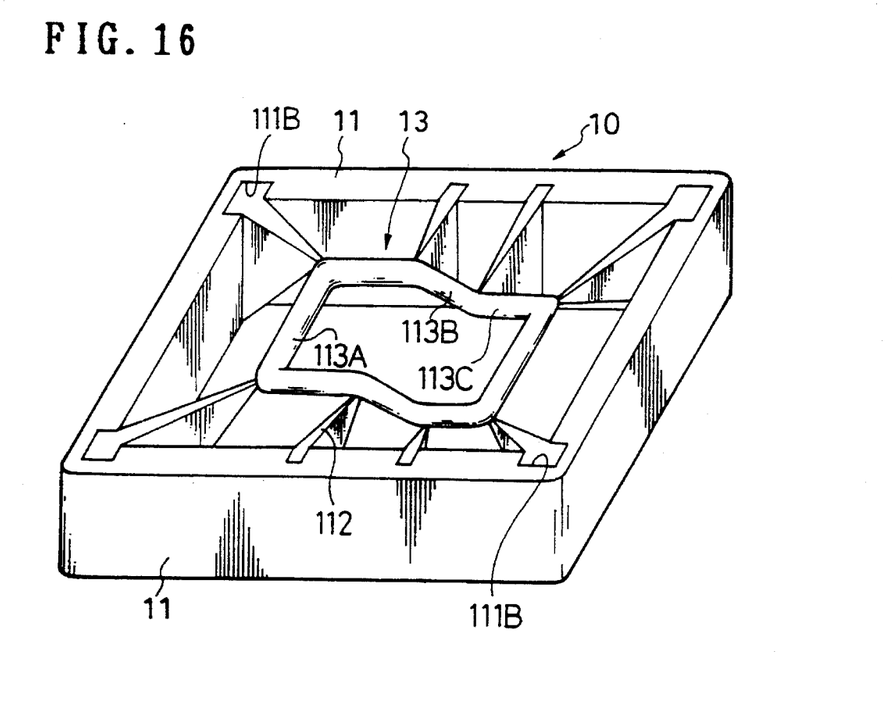
FIG. 16 is a perspective view of a rubber-like molded product with a support frame in accordance with a fourth embodiment.

FIG. 16 shows a fourth embodiment of the rubber-like molded product with a support frame in accordance with the present invention. This embodiment concerns the rubber-like molded product with a support frame 10 which is applied to the rubber-like molded product 13 having areas which are vertically offset from each other with respect to an imaginary horizontal line in the state shown in FIG. 16. That is, the fitting surface of the fitted member to which the rubber-like molded produce 13 is fitted is not necessarily confined to a planar surface. Actually, there are cases where inclined surfaces are provided between mating mechanical components, and this embodiment is particularly suitable to such a case.

As shown in FIG. 16, the rubber-like molded product 13 is comprised of an upper region 113A located at a highest position with respect to the imaginary horizontal line and a lower region 113C which continues from the upper region 113A via a pair of inclined regions 113B. The connecting ribs 112 for connecting this rubber-like molded product 18 to the support frame 11 are respectively formed in a substantially triangular shape, and their apexes located on their inward sides are connected to the rubber-like molded product 18 in the same manner as adopted in the foregoing embodiments.

The support frame 11 has a plurality of groove-like engaging structure portions 111B formed on its inner peripheral side in such a manner as to extend in a vertical direction. Portions of the connecting ribs 112 engage in these engaging structure portions 111B, whereby the integration of the support frame 11 and the connecting ribs 112 is attained.

Therefore, in accordance with this fourth embodiment, the rubber-like molded product 18 having areas which are vertically offset from each other with respect to the imaginary horizontal line can be supported by the support frame 11. As such, the present invention can be applied to rubber-like molded products having various three-dimensional shapes, so that it is possible to obtain an additional advantage in that the versatility in the application of the invention can be expanded.

As described above, in accordance with the present invention, it is possible to provide a rubber-like molded product with a support frame, a method of manufacturing the same, and a method of fitting a rubber-like molded product which are capable of exhibiting the following unprecedented outstanding effects and advantages: The shape-retaining characteristic of the rubber-like molded product whose shape is unstable can be constantly maintained in a stable manner; the rubber-like molded product and the support frame which is used to ensure the shape-retaining characteristic can be integrally molded with ease; and only the rubber-like molded product can be accurately fitted to the fitted member simply and in a state in which the shape-retaining characteristic is maintained.

What is claimed is:

1. A method of fitting an elastomer molded product to a fitted member comprising the steps of:

transporting a support frame having a predetermined shape in which the elastomer molded product is integrally molded in an inner region of the support frame via a connecting member by transporting means and positioning said support frame at a predetermined corresponding position of said fitted member;

fitting said elastomer molded product into a predetermined portion of said fitted member, the predetermined portion including a groove structure for receiving said molded product, and simultaneously cutting off said elastomer molded product from said connecting member by means of a pushing jig disposed in face-to-face relation with said fitting member; and removing said connecting member and said support frame from said fitted member.

2. A method of fitting an elastomer molded product according to claim 1, wherein said pushing jig comprises a cutting blade and a suction mechanism, a connecting portion between said connecting member and said elastomer molded product being cut off by said cutting blade, and said connecting member being removed while being sucked by said suckling mechanism.